US011986431B2

(12) United States Patent
Schwarz

(10) Patent No.: US 11,986,431 B2
(45) Date of Patent: May 21, 2024

(54) STANDING ASSISTANCE DEVICE AND METHOD

(71) Applicant: Maximillian M. Schwarz, Halesite, NY (US)

(72) Inventor: Maximillian M. Schwarz, Halesite, NY (US)

( * ) Notice: Subject to any disclaimer, the term of this patent is extended or adjusted under 35 U.S.C. 154(b) by 197 days.

(21) Appl. No.: 17/692,510

(22) Filed: Mar. 11, 2022

(65) Prior Publication Data

US 2023/0285213 A1 Sep. 14, 2023

(51) Int. Cl.
*A61G 7/10* (2006.01)

(52) U.S. Cl.
CPC ......... *A61G 7/1096* (2013.01); *A61G 7/1019* (2013.01)

(58) Field of Classification Search
CPC .. A61G 7/1096; A61G 7/1019; A61G 7/1038; A61G 13/1245; A61G 5/14; A61G 7/1011; A61G 7/1013; A47C 16/04; A47C 20/04; A47C 20/042; A47C 20/046; B66F 3/10; B66F 3/12; B66F 3/18; B66F 2700/03; B66F 2700/04; B66F 1/06
USPC .......................................................... 248/422
See application file for complete search history.

(56) References Cited

U.S. PATENT DOCUMENTS 755,706 A * 3/1904 Schellenbach ........... A47B 9/00 254/89 R
3,224,016 A * 12/1965 Anderson .............. A61G 9/003 5/81.1 R
4,623,163 A * 11/1986 Potts .................... A61G 5/0858 280/47.38
5,265,689 A * 11/1993 Kauffmann .......... A61G 5/1051 297/DIG. 10
5,375,911 A * 12/1994 Morrow ................. A47C 3/029 297/DIG. 10
6,089,667 A * 7/2000 Hobbs .................... A47C 16/04 108/150
10,045,895 B2 8/2018 Eklof et al.
10,874,568 B2 12/2020 Yang et al.
10,932,967 B2 3/2021 Haskett et al.
10,945,910 B2 3/2021 Picazo
2006/0284462 A1* 12/2006 Cheng .................. A61G 7/1007 297/326
2007/0086880 A1* 4/2007 Jordan ................. A61G 7/1046 414/630
2010/0095453 A1 4/2010 Lin et al.
2013/0180557 A1 7/2013 Triolo et al.
2015/0250321 A1* 9/2015 Perry ..................... A47C 16/04 297/423.11
2017/0333745 A1 11/2017 Tekulve
2018/0070732 A1* 3/2018 Pillay ................... A61G 7/1013

* cited by examiner

*Primary Examiner* — Christopher Garft
(74) *Attorney, Agent, or Firm* — Dilworth & Barrese, LLP

(57) ABSTRACT

A standing assistance device can help a user in need of standing assistance to use their upper body weight to push down on a plunger portion of the device to provide upward lifting force to a platform. Therefore, when a user kneels on the platform and leans down on the plunger, the downward leaning force is converted into upward lifting force to help a user rise to a standing position. The plunger can take the form of a horizontal crossbar. The platform can be linked to the plunger with a gearing mechanism to transfer the downward force on the plunger to upward lifting force on the platform. The device does not need electric motors and should be easy to carry around.

18 Claims, 5 Drawing Sheets

STANDING ASSISTANCE DEVICE AND METHOD

BACKGROUND OF THE INVENTION

The invention relates generally to a device and method for providing assistance to a user who needs assistance to rise from a kneeling position to a standing position.

Many individuals, such as those of advanced age, find it difficult to rise from a lowered position, such as a kneeling position, to a standing position. This can interfere with their independence and physical well-being. For example, an individual might be kneeling as they work in a garden and then have difficulty rising to a standing position. Moreover, some individuals might lack the arm strength to pull themselves to a standing position.

One device for assisting a user with the challenges of standing is described in U.S. Pat. No. 10,945,910, the contents of which are incorporated herein by reference. This and other prior art devices used to help an individual rise to a standing position tend to be overly complicated, expensively constructed, unwieldy and inconvenient for a user to carry around, such as when they need to repeatedly kneel and stand when performing various activities. Some require power cables, battery replacements, electric motors and the like, which is undesirable.

Accordingly, there is a need for a device and method that can help a user rise to a standing position, that avoids drawbacks of the prior art.

SUMMARY OF THE INVENTION

Generally speaking, in accordance with the invention, a standing assistance device and method is provided, wherein a user can use their upper body weight to provide lifting assistance as they rise to a standing position. In one embodiment of the invention the user can use their body weight to push down on a plunger portion of the device. The device is constructed to convert this downward force to upward force, which will provide lifting force to a platform portion of the device. For example, the device can use leverage, such as with a gearing system to transfer downward force to upward force. Therefore, when a user kneels on the platform and pushes down on the plunger portion of the device, the downward force is converted into lifting force to help a user rise to a standing position.

In one embodiment of the invention, the plunger comprises a horizontal crossbar and the device is sized such that the crossbar will be at or slightly below the approximate chest level of an average adult. The crossbar can be padded, such as with a foam sleeve or cushion. Thus, the device should have an overall height of over about 1.5 feet, preferably about 2-3 feet, most preferably about 2.5 feet. The lifting platform can have a rectangular shape, and can be formed with concave depressions to conform to the knees of a user. It is advantageous that the platform have a padded, soft surface. The platform should have a width of about at least 9 inches, preferably at least 12 inches, more preferably about 12 to 18 inches.

A force transfer mechanism can be used to convert the downward force on the plunger portion into upward lifting force on the platform. In one embodiment of the invention, a gearing system can be used to transfer the downward force into upward force. A chain and cog system similar to a bicycle chain drive and gear system can be used. In one embodiment of the invention, a hydraulic system similar to an automotive brake system can be used.

In another embodiment of the invention, a crossbar can be coupled to an elongated rod, with external helical screw threads. The rod can be received into a complementary threaded receiving tube. The threaded helical gear or the threaded receiving tube can be fixed in position with respect to the crossbar, such that as the crossbar is pushed down, the threaded rod is pushed down into the receiving tube, causing the receiving tube to rotate. Alternatively, the tube can be fixed to the crossbar and the externally threaded rod can rotate with respect thereto. An external helical worm gear extending from the bottom of the tube (or rod) will rotate with the tube (or rod), and can cause a second gear, such as a compound gear to rotate. This rotating second gear can cause a toothed rack to slide sideways. The rack can be coupled to the bottom end of a scissor lift. This can cause the scissor lift to slowly raise the platform. The platform should rise more than about a foot, preferably more than 1.5 feet to help a user stand on their own.

Other advantages and objects of the invention will be apparent from the drawings and descriptions to follow.

BRIEF DESCRIPTION OF THE DRAWINGS

The following drawings are presented for illustration only, and should not be considered to limit the scope of the invention. The drawings are proportional, but other proportions are acceptable, within the spirit and scope of the invention.

DETAILED DESCRIPTION OF THE PREFERRED EMBODIMENTS

Figure 1:
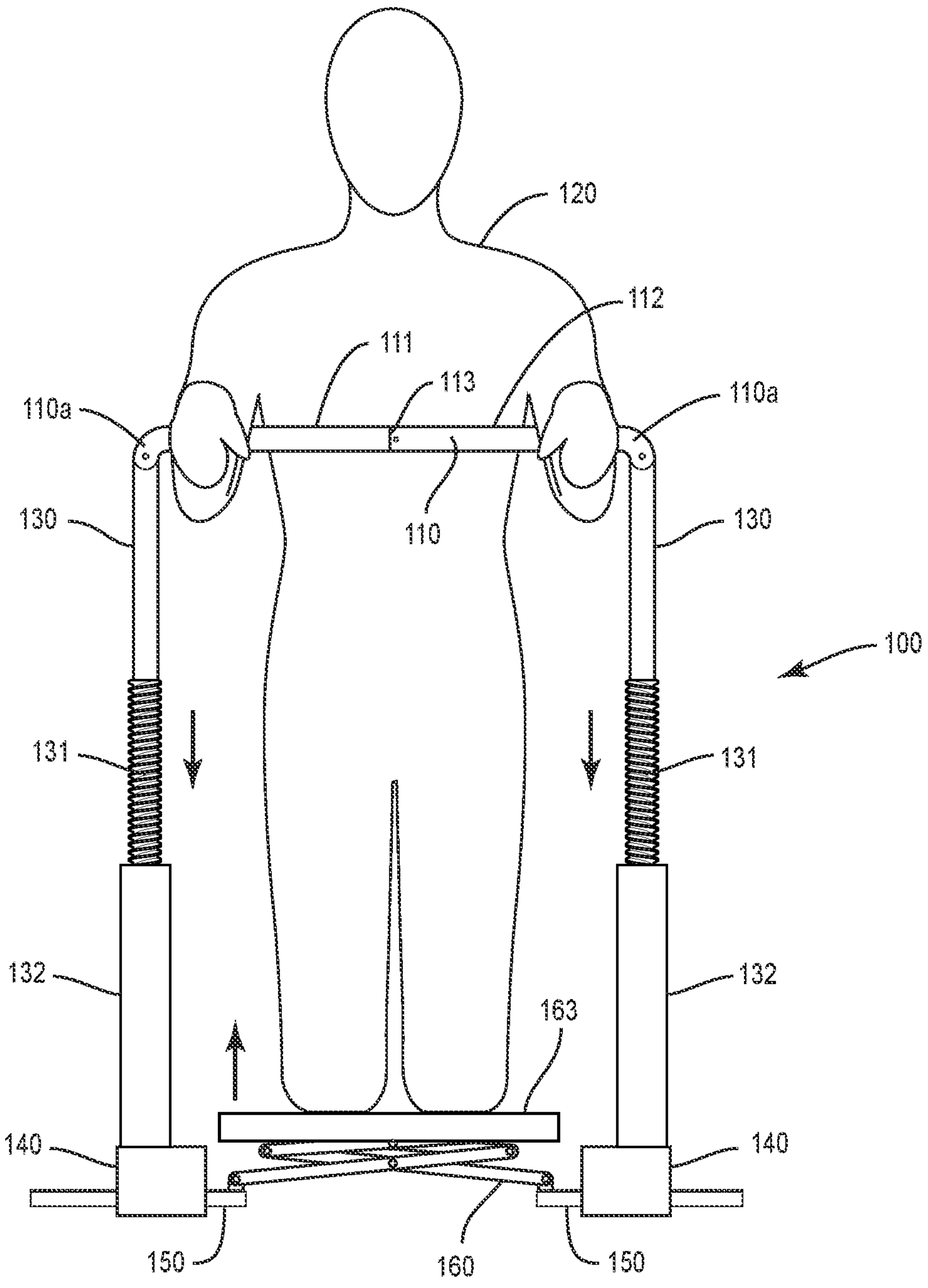
FIG. 1 is a front view of a standing assistance device (and a user thereof), in accordance with a preferred embodiment of the invention, with the platform in the collapsed, lowered configuration.

The present disclosure may be understood more readily by reference to the following detailed description of the disclosure, taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

A device for providing standing assistance to a user in need thereof is shown generally as a standing assister 100. Standing assister 100 includes a plunger mechanism in the form of a crossbar 110. Crossbar 110 includes two halves, 111 and 112 attached with a releasable spring pin connector 113 for ease in storage. A user 120 is shown in the kneeling position in FIG. 1, with their arms and upper body leaning down on crossbar 110. The user's elbows can be above or below crossbar 110. Alternatively, the user can grab crossbar 110 with their hands and pull down on crossbar 110 without leaning on crossbar 110. A pair of vertical rods 130 descend from a pair of ends 110*a* of crossbar 110. At least a lower portion of vertical rods 130 include a helical threaded worm gear portion 131. Threaded portions 131 extend into the open tops of a pair of respective upwardly extending internally threaded receiving tubes 132. Tube 132 is shown in cross-section in FIG. 4. An internally threaded portion 133 of receiving tubes 132 engages threads 131 of vertical rods 130.

Receiving tubes 132 are rotatably supported by and secured to a respective pair of lower housings 140. A respective bottom rod 134 extends downward from each receiving tube 132, into each respective housing 140 through an opening 142. Bottom rod 134 is fixed with respect to receiving tube 132. Thus, as receiving tube 132 rotates, bottom rod 134 will rotate therewith. Therefore, depressing rods 130 downward into receiving tubes 132, causes receiving tubes 132 to rotate, thereby causing bottom rods 134 to rotate.

A compound gear 141 is positioned within each housing 140. Compound gear 141 includes a plurality of outer teeth 143 and inner teeth 144. Each bottom rod 134 includes a length of bottom rod threading 135. Bottom rod threading 135 engages outer teeth 143 of gear 141. Outer teeth 143 can be helical to better match the helix of threading 135. As bottom rods 134 rotate, the rotation of bottom rod threading 135 causes compound gears 141 to rotate.

A pair of horizontal rack gears 150 are positioned through each housing 140. These rack gears 150 includes a plurality of teeth 151. Teeth 151 are positioned to engage inner teeth 144 of the respective compound gears 141. Thus, as compound gears 141 rotate, they cause rack gears 150 to slide horizontally (inwardly or outwardly), based on the selected threading arrangements.

Figure 2:
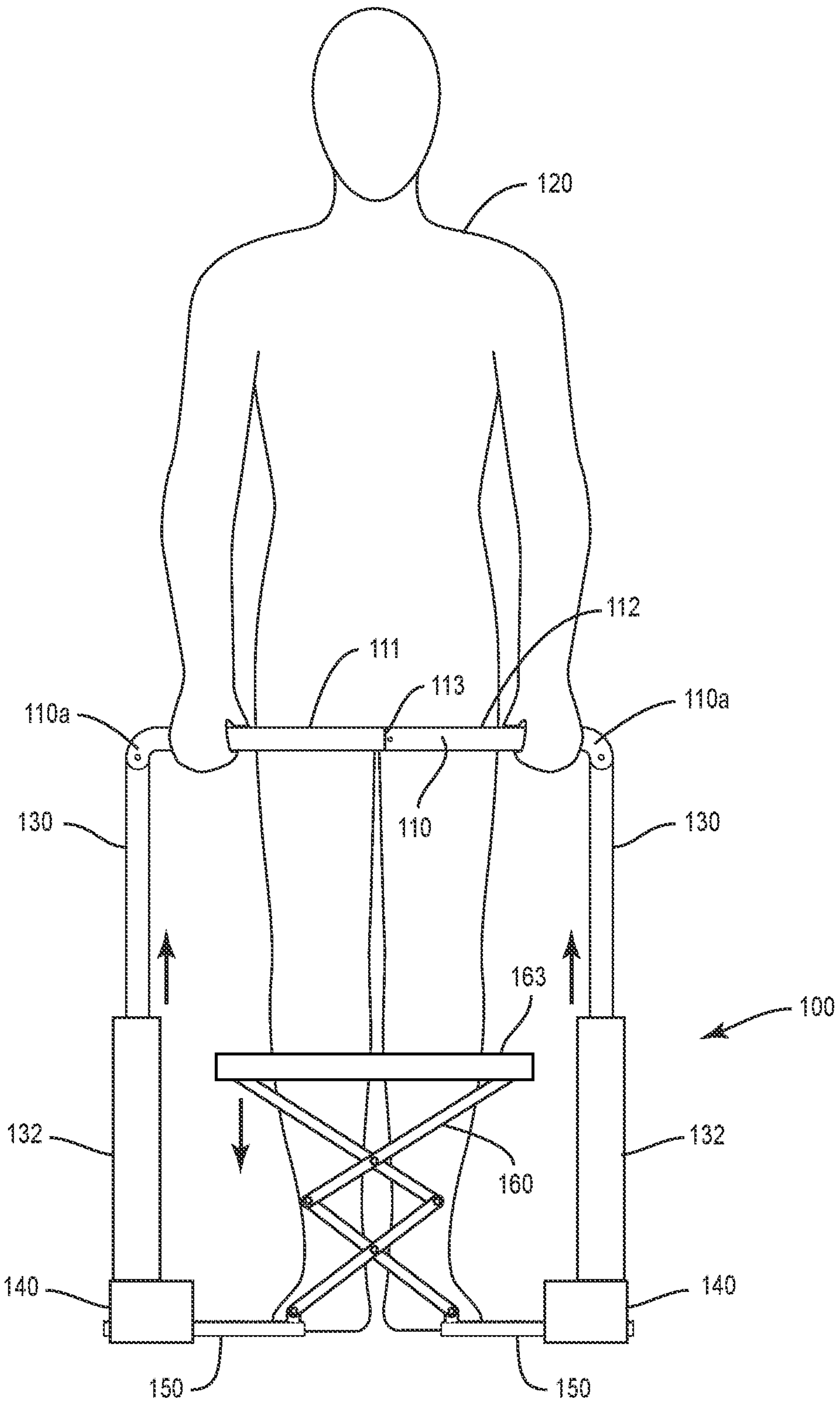
FIG. 2 is a front view of the standing assistance device (and user) of FIG. 1, with the platform in the extended, raised configuration.
Figure 3:
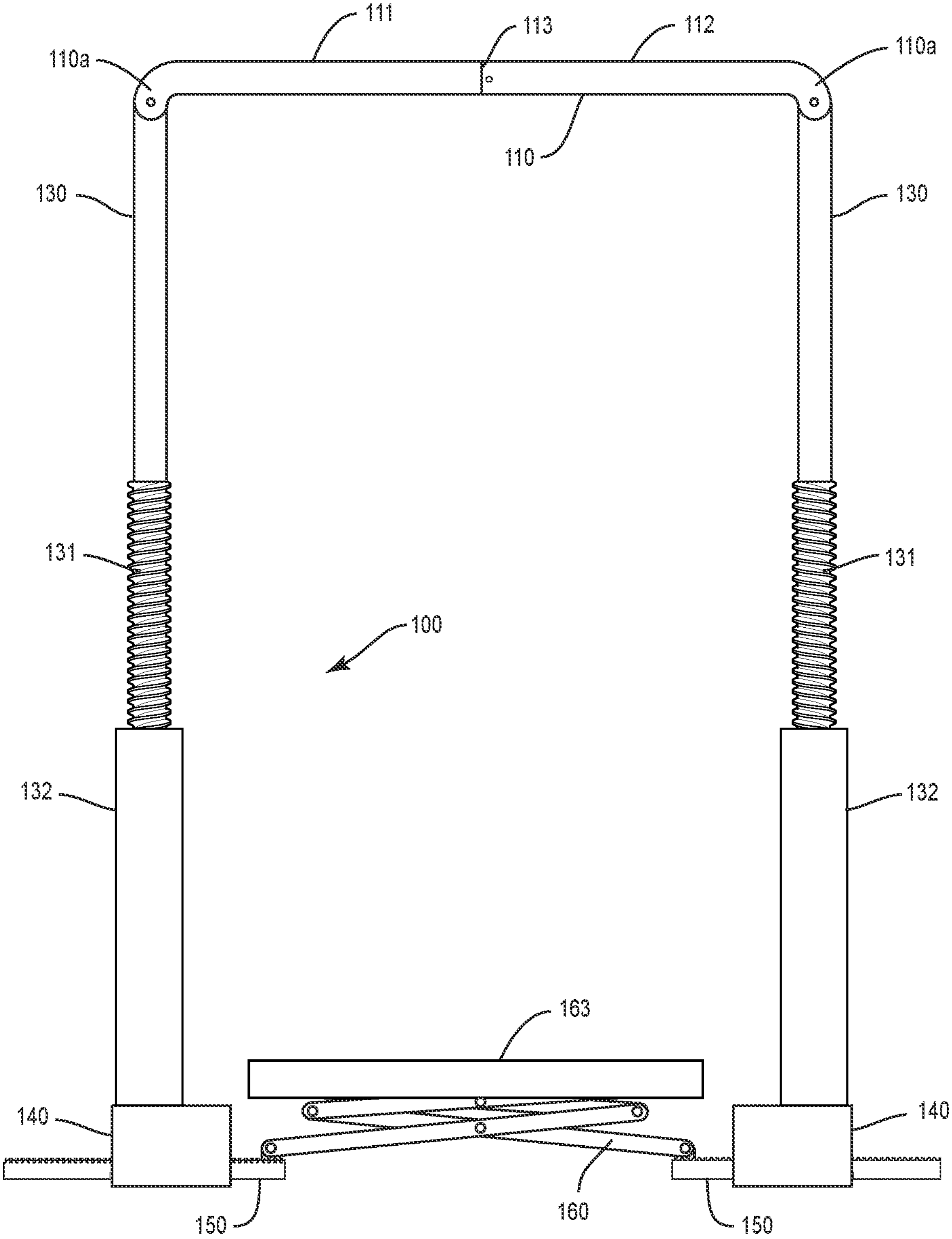
FIG. 3 is an enlarged front view of the device of FIG. 1.
Figure 4:
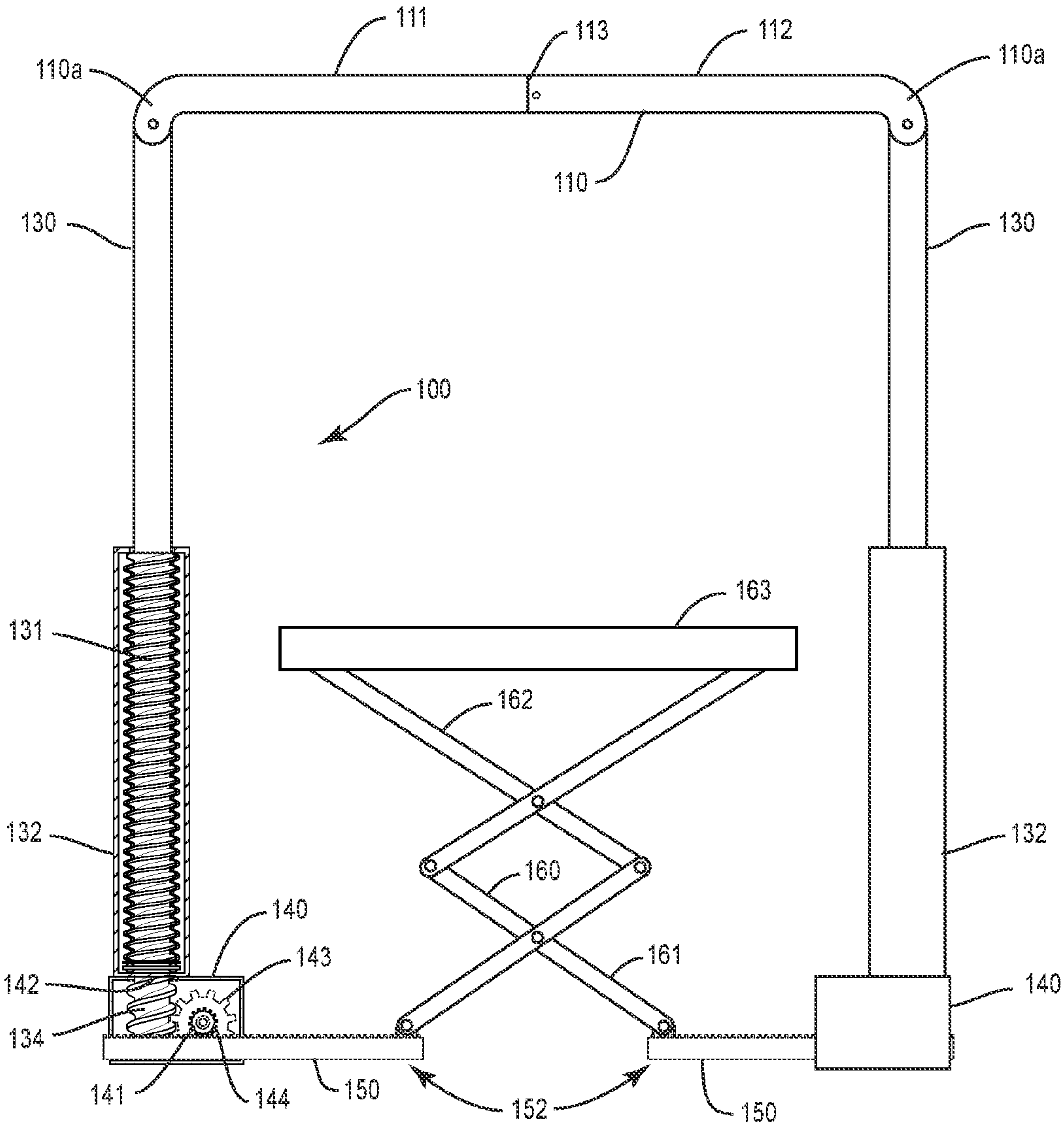
FIG. 4 is a partial cut-away front view of the device of FIG. 2.
Figure 5:
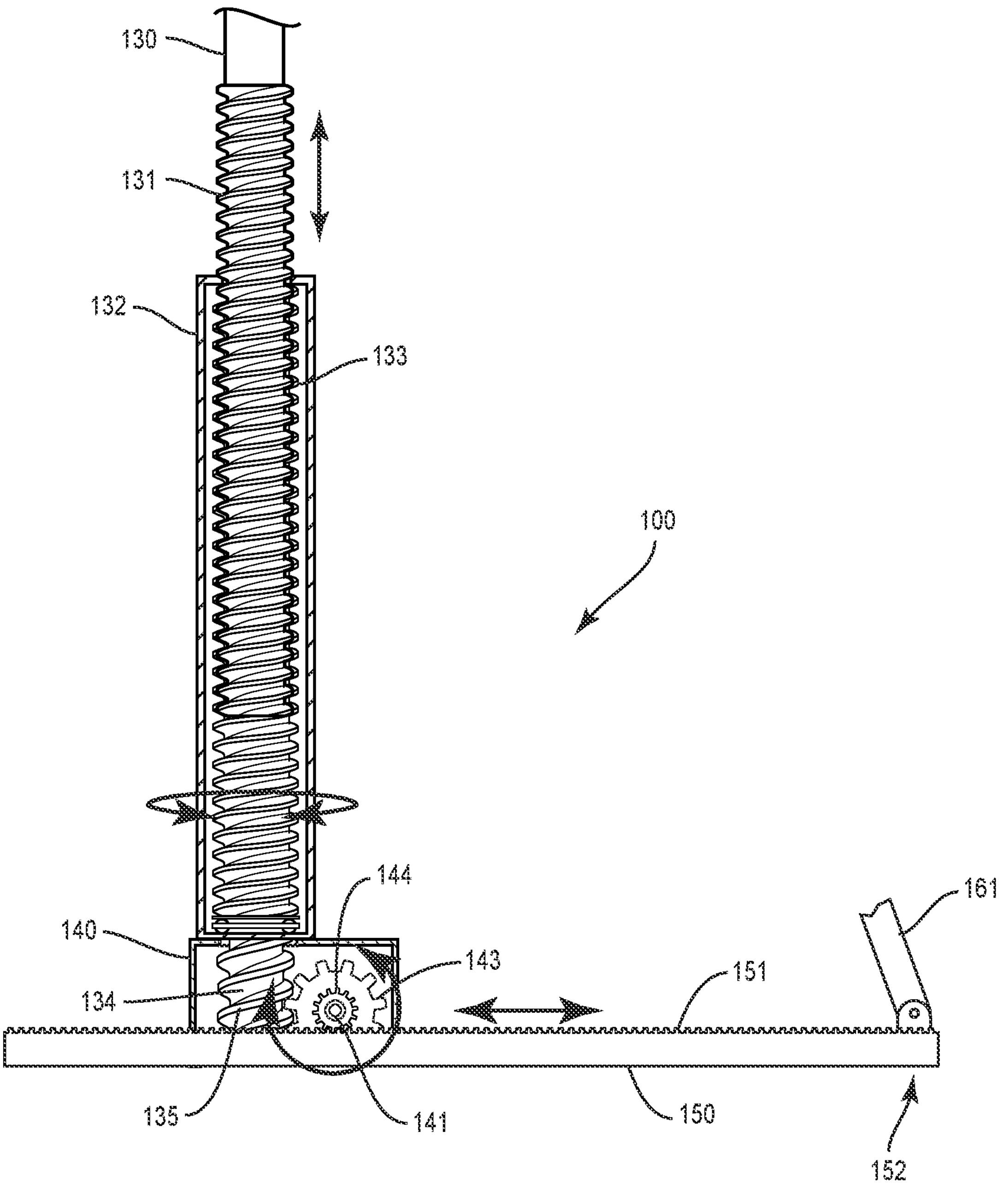
FIG. 5 is a partial cut-away front view of the device of FIG. 4.

A scissor lift 160 is shown in the collapsed, lowered configuration in FIGS. 1 and 3, and in the extended, raised configuration in FIGS. 2 and 4. A pair of lower ends 161 are pivotably coupled to the respective ends of a pair of inside rack ends 152 of respective rack gears 150. As lower ends 161 of scissor lift 160 are slid towards each other, scissor lift 160 extends, and provides upward force to a platform 163 to help user 120 rise to the standing position. A pair of upper ends 162 of scissor lift 160 is pivotably connected to platform 163. Thus, as lower ends 151 are spread apart, platform 163 lowers to the collapsed configuration of FIG. 3. As lower ends 161 are pushed together, scissor left 161 extends to the raised configuration, providing lifting force to platform 163.

Standing assister 100 can be used by user 120 in need of standing assistance with the following procedure. User 120 kneels on platform 163, as shown in FIG. 1. User 120 then pushes of leans down on crossbar 110. This causes lower portions 131 of rods 130 to extend downward into receiving tubes 132. This causes receiving tubes 132 to rotate, which in turn, causes bottom rods 134 to rotate. As bottom rods 134 rotate, they cause compound gear 141 to rotate, which slides each rack gear 150 inwardly, towards each other. Sliding rack gears 150 towards each other extends scissor lift 160, which provides lifting force to platform 163, and helps user 120 rise to the standing position, by transferring their downward force into upward force.

It is preferred that a standing assistance device in accordance with the invention be light, and easy for a user to carry around. Therefore, aluminum is a preferred material for construction. The threading and gearing should be adjusted to provide about a 2:1 to 10:1, preferably a 5:1 to 6:1 mechanical advantage.

In one embodiment of the invention, the plunger, which can be padded, is sized such that it will be at or slightly below the approximate chest level of an average adult. Thus, the device should have an overall height of over about 1.5 feet, preferably about 2-3 feet, most preferably about 2.5 feet in the lowered collapsed configuration. In this configuration, it should be lower than about 4 feet. The overall width should be more than about 2 feet. The width can be under about 4 feet. Preferred widths are about 2.5 to 3.5 feet, The lifting platform can have a rectangular shape, and can be formed with padded and/or concave depressions for the knees of a user. It is advantageous that the platform has a padded, soft surface. The platform should have a width of at least about 9 inches, preferably at least about 12 inches, more preferably about 12 to 18 inches. The platform should rise more than about a foot, preferably more than 1.5 feet, to help a user stand on their own Those of ordinary skill in the art will appreciate how additional force transfer mechanisms can convert the downward force on a plunger portion of the device into upward lifting force on the platform to help a user rise to a standing position. In one embodiment of the invention, a gearing system or a bicycle chain drive type element can be used to transfer the downward force on the plunger into upward force on the lifting platform.

In one embodiment of the invention, for example, a crossbar can be coupled to an elongated helical gear system, with a helical screw coupled to a threaded receiving tube. The threaded helical gear can be fixed in position with respect to the crossbar, such that as the crossbar is pushed down, the helical gear is pushed down into the receiving tube, causing the receiving tube to rotate. Alternatively, the receiving tube can be fixed with respect to the crossbar and the threaded rods mounted on the bottom housing and the rods configured to rotate with respect to the fixed tube. An external helical worm gear at the bottom of the tube (or rod) will rotate with the rotating tube (or rod), and can cause a gear or a compound gear to rotate. This rotating gear (or compound gear) can cause a toothed rack to slide sideways. The rack gear can be attached to the ends of a scissor lift, and cause the scissor lift to slowly raise the platform. Alternatively, the end of the scissor lift can be attached to a rotating wheel to extend or collapse the scissor lift mechanism.

It is preferred that the device not require electrical cords to connect the device to a power source. It is also preferred that the device include no electrical motors, such as for raising the platform. The device should be light enough to be carried around. It should be less than 40 pounds, preferably less than 25 pounds.

Note that where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A standing assistance device, comprising:

a platform, constructed to support the knees of a user, the platform selectively displaceable between a raised and a lowered configuration;

a lifting mechanism coupled to the platform, the lifting mechanism containing features adapted to transfer force and constructed and adapted to selectively raise the platform from the lowered to the raised configuration in response to force received from a force transfer mechanism coupled thereto;

the force transfer mechanism constructed and adapted to receive force from a plunger portion comprising a crossbar having two ends, and transfer downward force to the plunger portion into upward force on the lifting mechanism, and cause the platform to rise from the lowered to the raised configuration;

neither the lifting mechanism, nor the force transfer mechanism comprising an electric motor;

whereby a user kneeling on the platform can apply downward force to the plunger portion to provide lifting force to the platform and assist the user to rise to a standing position.

2. The standing assistance device of claim 1, wherein the lifting mechanism comprises an externally threaded rod, operatively received by an internally threaded tube.

3. The standing assistance device of claim 2, wherein the externally threaded rod is fixed to an end of the crossbar.

4. The standing assistance device of claim 1, wherein the lifting mechanism comprises a scissor lift.

5. The standing assistance device of claim 1, wherein the force transfer mechanism comprises a hydraulic force transfer system.

6. The standing assistance device of claim 3, and comprising a base, wherein the internally threaded tube is rotatably secured to the base, and the rod, the tube, and the base are constructed and adapted such that pushing the rod down into the tube causes the tube to rotate with respect to the rod and the base.

7. The standing assistance device of claim 6, wherein a bottom portion of the tube includes an externally threaded post extending downward therefrom, whereby rotation of the tube causes rotation of the post and pushing the rod down into the tube causes the post to rotate in a first direction.

8. The standing assistance device of claim 7, wherein the post is coupled to a gearing system, which is coupled to a scissor lift, which is coupled to the platform, and the gearing system and scissor lift are constructed, arranged and adapted such that rotation of the post in the first direction causes the scissor lift to impart lifting force on the platform.

9. The standing assistance device of claim 3, wherein the lifting mechanism comprises a pair of externally threaded rods, and a pair of internally threaded tubes; and the force transfer mechanism comprises the pair of the internally threaded tubes, wherein each of the threaded rods is received by one of the respective threaded tube of the pair of tubes and each internally threaded tube is rotatably secured to a base of the device, the rods, the tubes, and the base are constructed and adapted such that pushing the rods down into the tubes causes the tubes to rotate in a lift direction with respect to the rods and the base;

a bottom portion of each of the tubes includes an externally threaded post extending downward therefrom, whereby rotation of the tubes in the lift direction causes the posts to rotate in the lift direction;

each post is coupled to a respective gearing system, and each gearing system is coupled to a scissor lift, the scissor lift coupled to the platform, and the gearing systems and scissor lift are constructed, arranged and adapted such that rotation of the posts in the lifting direction causes the scissor lift to impart lifting force on the platform.

10. The standing assistance device of claim 9, wherein the gearing system includes a toothed rack gear coupled to the scissor lift, and the gearing system is constructed and adapted such that rotation of the post in the first direction causes the rack gear to slide sideways and cause the scissor lift to extend upwards.

11. The standing assistance device of claim 9, wherein the respective gearing systems include a toothed rack gear coupled to the scissor lift, and the gearing systems are constructed and adapted such that rotation of the posts in the lifting direction causes the rack gears to slide sideways and cause the scissor lift to extend upwards.

12. The standing assistance device of claim 1, wherein the plunger portion is at least about 1.5 feet high, when the platform is in the lowered configuration.

13. The standing assistance device of claim 4, wherein the scissor lift is constructed and adapted to raise the platform at least 1 foot from the lowered to the raised configuration.

14. The standing assistance device of claim 1, wherein the device weighs less than 40 pounds.

15. A method of rising to a standing position by a user in need of assistance to stand, comprising:

kneeling on a lifting assistance device, the device comprising a platform constructed to support the knees of the user, the platform selectively displaceable between a raised and a lowered configuration; a lifting mechanism, constructed to selectively raise the platform from the lowered to the raised configuration, the lifting mechanism coupled to a force transfer mechanism, constructed and adapted to transfer downward force to upward force, and cause the platform to rise from the lowered to the raised configuration; a plunger portion coupled to the force transfer mechanism, adapted to transfer downward force on the plunger portion to the lifting mechanism; and applying downward force to the plunger portion to cause the platform to rise.

16. The method of claim 15, wherein the device does not include an electric motor to provide lifting force.

17. The method of claim 15, wherein the user applies downward force on the plunger portion by leaning their chest on the plunger portion.

18. The method of claim 15, wherein the platform rises at least 1 foot when the plunger portion is pushed down.

* * * * *